US009212061B2

(12) United States Patent
Bailey et al.

(10) Patent No.: US 9,212,061 B2
(45) Date of Patent: Dec. 15, 2015

(54) SEPARATION OF GASES

(75) Inventors: Michael Edward Bailey, Colchester (GB); Stefano Consonni, Piacenza (IT); Jonathan Alec Forsyth, Newbury (GB); Manuele Gatti, Ripalta Cremasca (IT); Emanuele Martelli, Piacenza (IT); Yasushi Mori, Hiroshima (JP); Kazumasa Ogura, Tokyo (JP); Federico Vigano, Piacenza (IT)

(73) Assignee: BP Alternative Energy International Limited (GB)

( * ) Notice: Subject to any disclaimer, the term of this patent is extended or adjusted under 35 U.S.C. 154(b) by 578 days.

(21) Appl. No.: 13/575,968

(22) PCT Filed: Jan. 21, 2011

(86) PCT No.: PCT/GB2011/000074
§ 371 (c)(1),
(2), (4) Date: Jul. 30, 2012

(87) PCT Pub. No.: WO2011/095759
PCT Pub. Date: Aug. 11, 2011

(65) Prior Publication Data
US 2012/0297822 A1 Nov. 29, 2012

(30) Foreign Application Priority Data

Feb. 2, 2010 (GB) .................................. 1001710.1
Apr. 13, 2010 (EP) .................................... 10250761

(51) Int. Cl.
F25J 3/00 (2006.01)
C01B 3/50 (2006.01)
C01B 3/52 (2006.01)
F25J 3/06 (2006.01)

(52) U.S. Cl.
CPC . *C01B 3/506* (2013.01); *C01B 3/52* (2013.01); *F25J 3/067* (2013.01); *F25J 3/0625* (2013.01);
(Continued)

(58) Field of Classification Search
CPC ............... Y01C 10/12; B01D 53/1406; B01D 53/1425; B01D 53/1481; F25J 3/0625; F25J 3/067; F25J 3/0655; F25J 2205/40; F25J 2205/50; F25J 2215/04; F25J 2215/80; C01B 2203/0415; C01B 2203/045; C01B 2203/0475; C01B 2203/0485; C01B 2203/146; C01B 2203/147
USPC ............................................................ 62/617
See application file for complete search history.

(56) References Cited

U.S. PATENT DOCUMENTS 3,614,872 A * 10/1971 Tassoney et al. ............... 62/54.2
3,824,766 A * 7/1974 Valentine et al. ................ 95/163
(Continued)

FOREIGN PATENT DOCUMENTS

EP 2 023 067 A1 2/2009
GB 1 163 006 A 9/1969
(Continued)

OTHER PUBLICATIONS

PCT Notification Concerning Transmittal of International Preliminary Report on Patentability (IPRP); PCT/GB2011/000074, (9 pgs) dated Aug. 16, 2012.
(Continued)

*Primary Examiner* — Keith Raymond
(74) *Attorney, Agent, or Firm* — Gunnar Heinisch

(57) ABSTRACT

A process for separating sour shifted synthesis gas feedstock into liquid carbon dioxide, a gaseous hydrogen-containing gas and separated sulphur-containing components includes the steps of a. scrubbing the sour shifted gas elevated pressure with an alcohol solvent in a first scrubber and separately recovering an alcohol stream containing the sulphur-containing components and a sweet shifted gas; b. thereafter cooling the sweet shifted gas to a temperature and elevated pressure at which the carbon dioxide contained therein condenses and a two-phase gas-liquid mixture is formed; c. separating the two-phase mixture of stage (b) into separate liquid carbon dioxide and gaseous hydrogen-containing fractions in a fractionation unit; d. extracting residual carbon dioxide from the separated gaseous hydrogen-containing fraction by scrubbing the gaseous hydrogen-containing fraction at elevated pressure with an alcohol solvent in a second scrubber and recovering an alcohol stream containing carbon dioxide; e. feeding the alcohol stream containing carbon dioxide produced in step (d) to the first scrubber and f. warming and expanding the scrubber gaseous hydrogen-containing fraction using at least one heat exchanger to exchange heat with the mixture of step (b) and at least one turbo-expander capable of recovering mechanical work. The process described may be used in for example Integrated Gasification Combined Cycles (IGCC) where the source of fuel is coal or low grade carbon sources such as lignite, tar sands and shale oil.

22 Claims, 3 Drawing Sheets

(52) U.S. Cl.
CPC ......... *F25J 3/0655* (2013.01); *C01B 2203/046* (2013.01); *C01B 2203/0415* (2013.01); *C01B 2203/0475* (2013.01); *C01B 2203/0485* (2013.01); *C01B 2203/0805* (2013.01); *C01B 2203/0883* (2013.01); *C01B 2203/146* (2013.01); *F25J 2205/40* (2013.01); *F25J 2205/50* (2013.01); *F25J 2215/04* (2013.01); *F25J 2230/30* (2013.01); *F25J 2240/30* (2013.01); *F25J 2270/06* (2013.01); *Y02C 10/12* (2013.01)

(56) References Cited

U.S. PATENT DOCUMENTS

| | | | |
|---|---|---|---|
| 4,097,250 A * | 6/1978 | Pagani et al. | 95/174 |
| 4,449,994 A * | 5/1984 | Hegarty et al. | 62/622 |
| 4,561,869 A * | 12/1985 | Gazzi et al. | 62/635 |
| 2006/0150812 A1 * | 7/2006 | Mak et al. | 95/199 |
| 2007/0221541 A1 | 9/2007 | McClanahan et al. | |

FOREIGN PATENT DOCUMENTS

| | | |
|---|---|---|
| WO | WO 2006/037323 A1 | 4/2006 |
| WO | WO 2010/103259 A2 | 9/2010 |

OTHER PUBLICATIONS

Register Sheet, Title "Treatment of Sour Synthesis Gas Using Hybrid Turbocapture", dated Feb. 11, 2013; Applicant: BP Alternative Energy International Limited, Inventors: Bailey, et al (1 pg).

* cited by examiner

SEPARATION OF GASES

This application is the U.S. national phase of International Application No. PCT/GB2011/000074 filed 21 Jan. 2011 which designated the U.S. and claims priority to British Application No. 1001710.1 filed 2 Feb. 2010, and European Application No. 10250761.3 filed 13 Apr. 2010, the entire contents of each of which are hereby incorporated by reference.

The present invention relates to a process for separating carbon dioxide from a mixture of gases in which the other main component is hydrogen. In particular the present invention relates to a process where carbon dioxide and hydrogen are separated and recovered as pure streams from sour shifted synthesis gas.

For environmental reasons it is becoming increasingly desirable to separate greenhouse and polluting gases from those gases which are environmentally benign, such as hydrogen, nitrogen or oxygen, in order to purify the latter or to make them fit for other duties. In particular increasing attention is being given to strategies in which carbon dioxide, the principle carbon containing product of the combustion of hydrocarbon fuels, is captured and stored underground in rock formations. Such strategies are particularly applicable in technologies such as Integrated Gasification Combined Cycle (IGCC) power stations processing coal or petroleum coke or their natural gas-fed equivalents where the carbonaceous fuel is first reformed or gasified to produce a crude synthesis gas which is then 'shifted' into a mixture of carbon dioxide and hydrogen fit for separation. The pure separated hydrogen gas can thereafter be burnt cleanly for power in a gas turbine.

A number of approaches to separating carbon dioxide from the shifted mixture of carbon dioxide and hydrogen have been proposed in the art including inter alia the use of membranes which are permeable to hydrogen and optionally nitrogen; membranes which are permeable to carbon dioxide and solvent extraction processes. Alternatively U.S. Pat. No. 3,614,872 describes an approach based on superatmospheric autorefrigeration. In the process described a gaseous feedstream at a pressure of 40 to 250 atmospheres is cooled so that 30 to 95% of the carbon dioxide is condensed by non-contact counterflow heat exchange with refrigerants and then separated from the uncondensed gases. The separated streams are themselves then separately employed as refrigerants to cool fractions of the feedstream. In the case of the uncondensed gas stream it is taught that further cooling capacity may be generated by expansion at constant enthalpy across a single valve or by expansion at constant entropy so that the gas is made to drive a single expansion engine or the rotor of a single turbo-electric generator.

Recently in our co-pending application PCT/GB/2009/001810 we have described an improvement to this process. The process described comprises in general terms first compressing and cooling the dried shifted product to a pressure and temperature at which carbon dioxide liquefies and thereafter separating the liquid carbon dioxide so generated from the other non-condensable gases (mostly hydrogen). Thereafter the separated components are returned to a temperature and pressure suitable for further use by a plurality of heat exchangers and turbo-expanders integrated amongst themselves and with those used to cool the incoming shifted mixture so that the total energy across the whole process is managed for optimum efficiency. Our application describes process configurations for achieving this outcome and in particular the use of compact, diffusion-bonded multi-channel heat exchangers to reduce the number of heat exchangers needed thereby simplifying the demands on hardware and space. Furthermore by utilising a plurality of turbo-expanders it is possible to carry out the whole process with improved energy efficiency and utilisation by closely matching the cooling curves and characteristics of the various streams employed in the process.

Whilst the process described in this application allows good separation of carbon dioxide from non-condensable hydrogen-rich gases we have shown in our subsequently filed application PCT/GB/2009/02895 that efficiency and product purity can be further improved if after separation the hydrogen-rich gas is subjected to scrubbing with an alcohol solvent (e.g. methanol) capable of absorbing residual carbon dioxide contained therein before it is returned to the desired temperature and pressure. This in turn leads to improved environmental benefits when the hydrogen-rich gas is used subsequently for example in a hydrogen fuelled power station.

In all of the processes described above it is desirable to treat shifted gas which is 'sweet' i.e. one which contains minimal levels of 'sour' sulphur containing components such as hydrogen sulphide, sulphur dioxide, carbonyl sulphides and the volatile mercaptans. This is because in the processes described above any such components typically end up in the liquid carbon dioxide thereby potentially causing their own environmental concerns if for example the carbon dioxide is stored underground. As a consequence if the initial synthesis gas is 'sour', as is typically the case when the initial carbonaceous feedstock is coal or low grade sources of carbon such as lignite, tar sand or shale oil, further strategies need to be applied to isolate these sulphur-containing components.

Our co-pending patent application PCT/GB/2009/002884 describes a variation of the process described in PCT/GB/2009/001810 in which this problem is addressed. In the process described therein the separated liquid carbon dioxide is vapourised and contacted with an alcohol solvent, typically cold methanol, to extract these sour components prior to being re-liquefied. Whilst this is a very effective process for sweetening the separated carbon dioxide it suffers from the disadvantage that it gives rise to additional complexity, heat management and process integration issues.

It is now been found that the process described in PCT/GB/2009/02895 can be modified to efficiently treat sour shifted synthesis gas by scrubbing the shifted synthesis gas before the carbon dioxide is liquefied and integrating the operation of this scrubber with the scrubber used to remove carbon dioxide from the hydrogen-containing gas downstream of the gas liquid separator.

According to the present invention there is therefore provided a process for separating a sour shifted synthesis gas feedstock into liquid carbon dioxide, a gaseous hydrogen-containing gas and separated sulphur-containing components by superatmospheric refrigeration characterised in that the process comprises the following stages:

(a) scrubbing the sour shifted gas at elevated pressure with an alcohol solvent in a first scrubber and separately recovering an alcohol stream containing the sulphur-containing components and a sweet shifted gas;

(b) thereafter cooling the sweet shifted gas to a temperature at which the carbon dioxide contained therein condenses and a two-phase gas-liquid mixture is formed;

(c) separating the two-phase mixture of stage (b) into separate liquid carbon dioxide and gaseous hydrogen containing fractions in a fractionation unit;

(d) extracting residual carbon dioxide from the separated gaseous hydrogen-containing fraction by scrubbing the gaseous hydrogen-containing fraction at elevated pressure with an alcohol solvent in a second scrubber and recovering an alcohol stream containing carbon dioxide;

(e) feeding the alcohol stream containing carbon dioxide produced in stage (d) to the first scrubber and (f) warming and expanding the scrubbed gaseous hydrogen-containing fraction using at least one heat exchanger to exchange heat with the mixture of stage (b) and at least one turbo-expander capable of recovering mechanical work The present invention has the advantage that by integrating the two scrubbers so that they utilize a common solvent greater energy efficiency is achieved relative to previously described processes. In particular relative to the process described in PCT/GB/2009/002884 the need to vapourised and re-condense the carbon dioxide is obviated thereby simplifying the process considerably given the volume of liquid carbon dioxide concerned.

In stage (a) of the process of the present invention, sour shifted synthesis gas typically at a pressure in the range 50 to 250 bar is fed to a first scrubber, typically a column, where it is contacted with an alcohol solvent. As explained below this alcohol solvent is derived from the second scrubber of stage (d) and contains dissolved carbon dioxide. Stage (a) is typically effected by continuously contacting a stream of the sour shifted gas with a stream of the cold alcohol under conditions which cause intimate and turbulent mixing of the two for example by counter-current mixing or by sparging the shifted gas through the alcohol. Under these conditions the sulphur-containing components and some of the carbon dioxide in the shifted gas dissolve in the alcohol and are removed from the system by way of an outlet effluent stream. During this stage the cold alcohol is progressively warmed as it encounters progressively warmer sour shifted synthesis gas creating a temperature gradient across the first scrubber. Suitably this temperature gradient is defined by an inlet temperature of the cold alcohol in the range −50 to 0° C. most preferably −50 to −20° C. and an outlet temperature of the warmed alcohol suitably in the range 0 to 50° C. preferably +5 to +35° C. One of ordinary skill will recognize that the exact inlet and outlet temperatures will depend upon the gas and solvent flow rates used and to a certain extent by how much carbon dioxide can be tolerated in the effluent stream. At the same time the outlet temperature should be chosen so that essentially all of the sulphur-containing components are removed by the first scrubber. Typically sweet shift gas is then removed overhead from the column and the outlet alcohol stream now containing both dissolved carbon dioxide and the sulphur-containing components removed from the bottom.

The outlet effluent stream so removed is then fed to at least one, preferably a series of flash vessels where the pressure is partially let down allowing carbon dioxide to be released from the alcohol solvent whilst the sulphur-containing components remain dissolved therein. Alternatively, this stream is fed to at least one, preferably a series of heat exchangers and separators where the temperature is gradually increased allowing carbon dioxide to be released from the alcohol solvent whilst the sulphur-containing components remain dissolved therein.

Thereafter the alcohol solvent now essentially containing essentially only dissolved sulphur-containing components is then removed and fed to a stripper column which regenerates pure alcohol and a gaseous stream of the sulphur-containing components which can be further processed in for example a Claus plant to recover the sulphur in elemental form.

The carbon dioxide released by the flash vessels can be collected, combined and fed back into the system. This feeding back can occur at a number of points including (1) into the sour shifted synthesis gas feed to stage (a), (2) into the second scrubber or the alcohol stream being fed thereto (stage (d)) or (3) into the sweetened shifted synthesis gas exiting the first scrubber. Of these possibilities the first is generally the most preferred.

In stage (b) of the process of the present invention, the sweet shift gas at a pressure in the range 50 to 250 bar is optionally further compressed and then cooled until some preferably over 90% of the carbon dioxide contained therein liquefies. Typically this involves passing the shifted gas though at least one heat exchanger in which it enters into heat exchange relationship with the cold separated liquid carbon dioxide and/or hydrogen rich fractions generated in stage (c) below thereby allowing these latter fractions to be warmed back towards their final desired temperature. In particular it is preferred that the flows of the shifted gas, the cold separated liquid carbon dioxide and the hydrogen rich fractions are configured so as to flow though at least one or at least one array of multi-channel diffusion bonded and/or micro-channel heat exchangers thereby cooling the shifted gas mixture to the operating temperature of the fractionation unit. Examples of such heat exchangers are described for example in EP 0212878 and WO 2004/017008 the contents of which are incorporated by reference herein.

In stage (c) the cooled shifted gas (now a two-phase mixture of liquid carbon dioxide and a non-condensable hydrogen rich gas) is separated in a fractionation unit. The exact temperature and pressure required to achieve this will depend on exactly how selective the fractionation unit is required to be but in all cases it is important that the two-phase mixture is prevented from becoming supercritical on the one hand or that the carbon dioxide is prevented from freezing out on the other. In practical terms, this means ensuring that at one extreme the temperature and pressure of the mixture should not exceed both the critical temperature and critical pressure of carbon dioxide ($T_c=31.4°$ C. and $P_c=73.9$ bar). At the other extreme it is necessary to ensure that the temperature of the mixture should not fall below the triple point temperature of carbon dioxide ($T_t=-56°$ C.). Within these boundary conditions it is desirable that the operating temperature of the fractionation unit is at least 20° C. below the boiling point of carbon dioxide at the operating pressure in order to obtain efficient separation.

It will be appreciated by one of ordinary skill that the thermodynamic constraints referred to above relate to ideal systems and that the shifted gases being treated herein may exhibit significant deviation from ideality potentially giving rise to an elevation of the triple point temperature. To allow for this possibility it is generally preferred that the temperature of the fractionation unit should be at least 3° C. preferably at least 5° C. above the theoretical triple point temperature of carbon dioxide. In practical terms and for the mixtures described herein this generally means operating the fractionation unit at a temperature in the range −25 to −53° C. and preferably in the range −40 to −50° C. At the same time the pressure should preferably be in the range 50 to 250 bar, preferably 100 to 200 bar as mentioned above.

The fractionation unit used in the process of the present invention is for example a conventional gas-liquid separator adapted to work at the high pressures and low temperatures set out above. In such vessels the gaseous hydrogen rich fraction is typically taken off overhead and the liquid carbon dioxide removed at or near the bottom. The pressure drop across the fractionator is typically no more than between 0.1 and 0.5 bar.

In a preferred embodiment of the present invention the separation of liquid carbon is carried out in a series of fractionating units at the same pressure and different temperatures or most preferably at the same temperature and different pressures. So for example a first fractionation unit might operate at a temperature in the range −20 to −53° C. and at a pressure in the range 50 to 100 bar and the second fractionation unit in the same range but at a pressure in the range 100 to 200 bar. In such a case it will be necessary to introduce a compression stage and possibly further heat exchange between the two fractionation units. An advantage of this approach it reduces the amount of gas which needs to be compressed to very high pressures.

After separation and before stage (f) the gaseous hydrogen-rich fraction is in stage (d) fed to a second scrubber where it is contacted with preferably a continuously fed and continuously removed stream of cold alcohol in order to extract residual carbon dioxide therefrom. This is typically effected by continuously contacting the hydrogen-rich fraction with the cold alcohol stream in a column under conditions which cause intimate and turbulent mixing of the two for example by counter-current mixing or by sparging the hydrogen rich fraction through the solvent. Under these conditions the residual carbon dioxide dissolves in the alcohol and is removed from the system by way of an effluent stream from the second scrubber. By effecting this contacting at the high pressure and low temperature characteristic of the fractionation unit a significant part of the residual carbon dioxide is caused to be absorbed by and to dissolve in the alcohol in accordance with Henry's law. The thermodynamic driving force behind this absorption process, which is enhanced at high pressures, works synergistically with the increased capacity of the solvent at low temperature to hold proportionately more carbon dioxide making a highly efficient system. In particular it is more efficient than the alternative i.e. conventional use of a Rectisol or Selexol treatment carried out at much lower pressures after the hydrogen-rich fraction has been returned to or near to its final desired state.

When conducting this second scrubbing it is preferred that the alcohol solvent used is selected from methanol, ethanol, the isomers of propanol and low molecular weight glycols and glycol ethers formed by oligomerisation of ethylene or propylene glycol. For obvious reasons the alcohol solvent chosen should be one which will not freeze under the operating conditions of either the first or second scrubbers. Since it is preferred that this second scrubbing is conducted immediately after stage (c) with no intermediate treatment of the hydrogen-rich fraction the operating temperature and pressure of the second scrubber should be the same as or substantially the same as those of the final fractionation unit. However the temperature and pressure ranges disclosed above for this fractionation unit are applicable mutatis mutandis to the second scrubber irrespective of whether any treatment of the hydrogen-rich fraction has occurred between the fractionation unit and the second scrubber. It will be appreciated however that the second scrubber works most efficiently when the cold alcohol solvent is fed to the scrubber at or close to the latter's operating temperature.

In stage (e) of the process the effluent alcohol solvent from the second scrubber now containing dissolved carbon dioxide is next fed to the first scrubber of stage (a). In doing so the alcohol solvent may optionally be passed through a heat exchanger to warm or cool it as they case may be depending on the relative operating conditions of the two scrubbers. Whilst it is preferred that the two scrubbers are operated isobarically if the first scrubber is operated at a higher pressure than the second it may be necessary to pump the effluent solvent between the two.

In stage (f) of the process of the present invention the hydrogen-rich fraction exiting stage (d) is warmed and decompressed in order to restore it to the temperature and pressure required for its further utilisation. In order to ensure that the energy utilisation of the process is as efficient as possible this stage is effected by passing this fraction through one preferably a plurality of turbo-expanders and associated interstage heat exchangers arranged in series. In each turbo-expander the hydrogen-rich fraction is expanded isentropically progressively reducing its pressure and progressively releasing expansion energy which in turn drives a turbine capable of recovering this energy as mechanical work. Typically, and depending on the pressure of the hydrogen-rich fraction after the final fractionation, the process of the present invention may suitably employ from two to eight turbo-expanders arranged in series preferably from two to six. The turbo-expanders themselves are conveniently arranged so that they drive a common shaft. The mechanical work generated can if desired be used elsewhere in the process thereby minimizing overall energy usage. At the same time the expansion of the hydrogen-rich fraction causes it to cool and the cooling capacity generated can be recovered in interstage heat exchangers and used to cool warmer streams elsewhere in the system especially those involved in stage (b). In a preferred embodiment these interstage coolers are integrated into a single or array of multi-channel heat exchangers though which the incoming sweetened shifted gas of stage (b) also flows in order to manage the cooling capacity of the whole system as efficiently as possible. In performing these series of expansions and coolings it is important not to let the temperature of the expanded hydrogen-rich fraction after each turbo-expansion fall below the triple point temperature of carbon dioxide in order to prevent progressive blockage of the transfer line between each turbo-expander and interstage heat exchanger by build-up over time of frozen, carbon dioxide derived from any very small amounts still remaining in this fraction. Once the hydrogen-rich fraction has been reduced to its desired temperature and pressure it can be used for its chosen duty.

Subsequent treatment of the liquid carbon dioxide recovered in stage (c) will depend to a certain extent on what is to be done with it. It may for example be piped or tankered offsite for underground storage. In this case it is desirable to liquefy any further gaseous carbon dioxide recovered in the optional scrubbing stage and combine it with the material recovered in stage (c). The liquid carbon dioxide may if desired be warmed by passing it through the multichannel heat exchanger to utilize its cooling capacity too. It is preferred that little or no expansion of the liquid carbon dioxide occurs downstream of the fractionation unit so that its pressure is maintained at or above 50 bar after the fractionation unit.

In some examples of the invention, it has been identified that shifted syngas exiting the $H_2S$ absorber or first scrubber, may contain significant amounts of the alcohol solvent (for example methanol) from the absorber. For example, at a pressure of about 60 Bar and at a temperature of about 40 degrees C., it has been found in some examples using a methanol solvent that 1.38 Mol % of methanol leaves the absorber with the gas. In such cases, it would be advantageous to recover some or all of the solvent contained in the sweet shifted syngas to reduce the need for make-up flows of solvent and/or for more efficient operation of the process.

Therefore the process of the present invention may further include the step of recovering solvent from the sweet shifted gas generated in step (a).

The step of recovering solvent may for example include cooling the sweet shifted gas generated in step (a), and separating solvent from the cooled sweet shifted gas. The method may further include and feeding the separated solvent to a scrubber.

The separated solvent may be fed to the first scrubber. Other options are possible. For example, the separated solvent may be fed to another solvent system used in the process, for example a second scrubber. Alternatively, the solvent may be exported from the system.

Thus the gas leaving the absorber may be cooled to condense solvent in the gas.

In a first example, the gas may be cooled using a heat exchanger system, for example including a coolant or refrigerant which may include an internal process stream and/or an external stream.

In an alternative arrangement, the gas leaving the absorber may be cooled by expansion of the gas. Thus the recovery of the solvent may be effected through an expansion and separation method.

Therefore the process of the present invention may further include the step of passing gas leaving an absorber to an expander, and expanding the gas to form a cooled gas and solvent liquid, and separating the solvent from the cooled gas.

The process may further include the step of compressing the cooled gas after the separation of the solvent.

The energy for the compression step may be provided by work recovered in the expansion step. In some examples, the cooled gas may be compressed back to its original pressure.

The gas may be for example expanded to less than 40 Bar, for example 30 Bar or less, for example 25 Bar. Preferably the gas is expanded to a pressure above 20 Bar to reduce the likelihood of significant $CO_2$ condensation.

In an example, which may be applied to for example the schemes illustrated in FIGS. 1, 2 and 3 and described below in Examples 1 to 3, an expander may be provided downstream of the first scrubber A1. The expander may reduce the pressure of the gas to 25 Bar and the temperature to −8 Degrees C. After separation of methanol solvent from the stream, it has been found in some examples that approximately 0.12 mol % methanol remained in the shifted synthesis gas. This represents less than one tenth of the amount of methanol leaving the absorber at a pressure of 60 Bar (see above).

In some examples, more than one method may be used to cool the gas stream to condense solvent, and the different methods may be used in any appropriate order.

Should the solvent (for example methanol) concentration in the gas be required to be further reduced, the gas exiting the intermediate separator after separation of condensed solvent may be warmed and washed with water in a suitably designed contactor. The resulting gas stream will contain a reduced amount of solvent and may be in some cases substantially free of solvent (for example methanol) and saturated with water. The water is then preferably removed from the substantially solvent free gas, for example by a standard drying method. The solvent, for example methanol, may be recovered from the solvent-containing water stream exiting the wash column by distillation, wherein the purified water may then be returned to the water wash column. The substantially dried solvent may be returned back to the solvent system.

A cooling and condensing step would usually be carried out to remove some of the solvent from the gas before a water washing procedure is carried out, but it is envisaged that the water washing might be carried out before, or instead of, a cooling and condensing separation procedure.

A solvent other than water might be used to wash the solvent from the gas.

Features relating to the removal of solvent, for example alcohol solvent, for example methanol, from the gas may be applied to other processes. For example, features relating to the removal of solvent from the gas may be applied to other methods in which a gas including carbon dioxide includes an alcohol solvent to be removed.

It will be apparent that the novel process of the present application can manifest itself as a separation plant employing the process described above. Accordingly there is further provided, in an embodiment of the present invention, a gas separation plant for converting sour shifted synthesis gas into separate streams consisting of liquid carbon dioxide, a hydrogen-rich fraction and sulphur-containing components characterised in that it comprises;

(a) a first scrubber for sweetening sour shifted gas by removing sulphur-containing components in an extraction process which uses an alcohol solvent derived from a second scrubber;

(b) a cooling system for cooling the sweetened shifted gas to a temperature at which carbon dioxide condenses and a two-phase gas-liquid mixture is formed said cooling system further comprising at least one heat exchanger in which relatively warm shifted synthesis gas is cooled against the relatively cool liquid carbon dioxide fraction and/or the relatively cool gaseous hydrogen-rich fraction generated by a fractionation unit;

(c) a fractionation unit for separating the two-phase mixture generated in said cooling system into separate liquid carbon dioxide and gaseous hydrogen-rich fractions;

(d) a second scrubber for removing residual carbon dioxide from said gaseous hydrogen-rich fraction by extraction using an alcohol solvent and adapted to provide the treated alcohol solvent to the first scrubber and (e) an expansion system for warming and expanding the separated gaseous hydrogen-rich fraction comprising at least one turbo-expander for progressively recovering energy from the gaseous hydrogen rich fraction as mechanical work and at least one means for supplying cooling capacity to at least one of the heat exchangers in the cooling system.

The shift and separation plant described above may typically form part of a larger integrated complex for example an Integrated Gasification Combined Cycle (IGCC) or similar hydrogen power plants which include the additional step of burning the hydrogen (preferably diluted with nitrogen) in the burners of a gas turbine. Alternatively some or all of the hydrogen so generated can be used in various refinery applications such as hydrocracking and hydrotreating.

The plant may further include a solvent recovery system including means for cooling a gas including solvent, and a separator.

The means for cooling the gas may include an expander, the expander preferably being arranged to receive and expand a gas including solvent to form a gas including liquid solvent, the separator being arranged to separate the liquid solvent from the gas.

The invention extends to methods and/or apparatus substantially as herein described with reference to the accompanying drawings.

Any feature in one aspect of the invention may be applied to other aspects of the invention, in any appropriate combination. In particular, features of method aspects may be applied to apparatus aspects, and vice versa.

The present invention will now be illustrated by reference to the following Figures and Examples.

EXAMPLE 1

Figure 1:
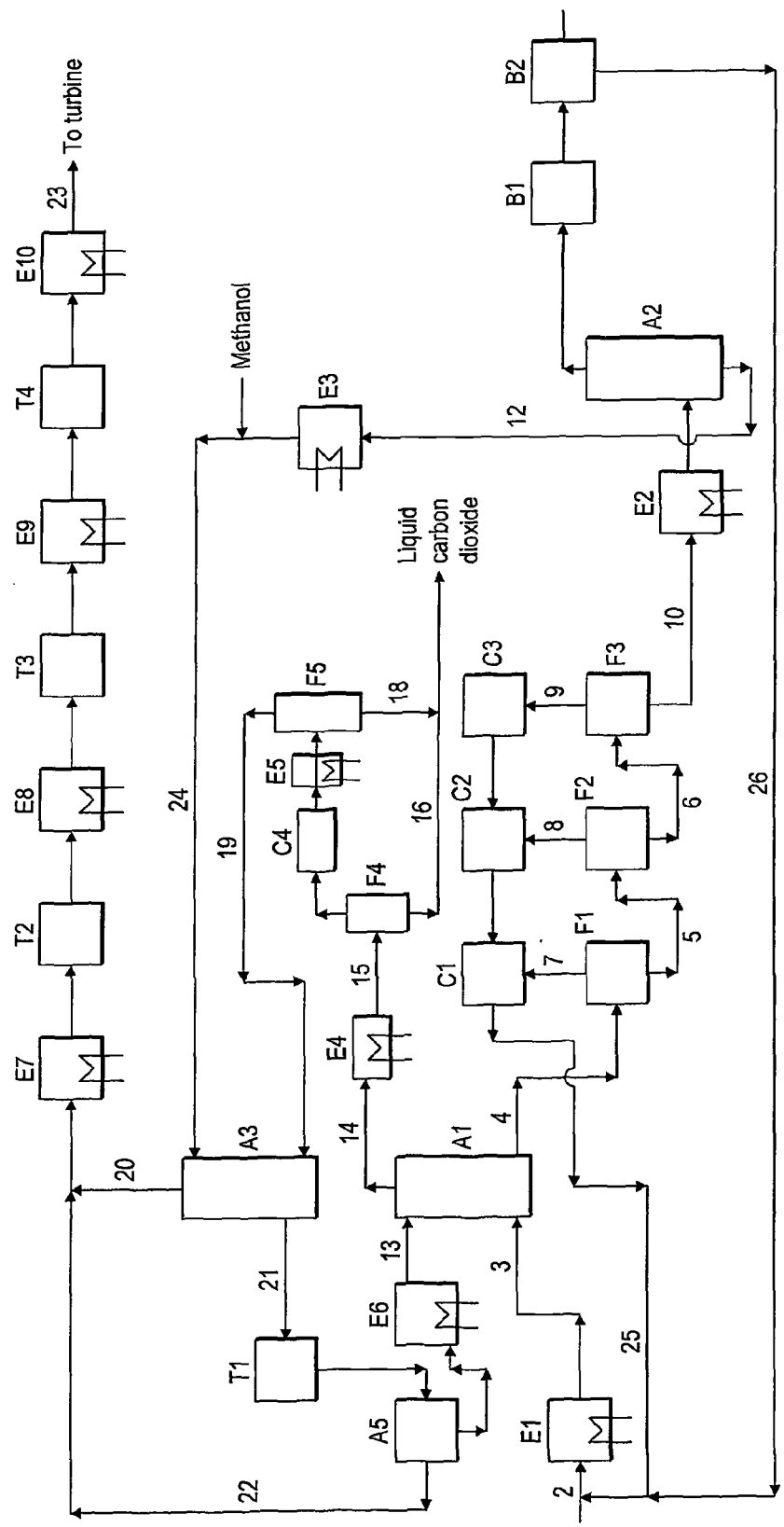
FIG. 1 shows schematically a first example of separation of a shifted synthesis gas feedstock.

In FIG. 1 a high temperature sour shifted synthesis gas feedstock at a pressure of 60 bar is fed via line 2 to a heat exchanger E1 where it is cooled to a temperature of 9° C. before being fed via 3 to a first scrubber A1 where it is contacted with a methanol solvent containing dissolved carbon dioxide. The methanol solvent used is obtained from a second scrubber A3 (see below), fed to the top of A1 via 13 and removed from the bottom via 4. As it passes through the column the methanol is warmed by the sour shifted synthesis gas from an inlet temperature of −50° C. to an outlet temperature of approximately +12° C. The methanol so removed and now containing the sulphur-containing components and some carbon dioxide is fed then via 4, 5 and 6 though a series of flash vessel (F1, F2, and F3) where the pressure is progressively let down and carbon dioxide is released. Overhead gas streams 7,8 and 9 from each of F1, F2 and F3 are fed at appropriate points to the inlet of compressors C1, C2 and C3 arranged in series which recompress the recovered carbon dioxide in stages back to 60 bar before it is recycled via 25 to line 2. Meanwhile the methanol solvent from F3 still containing dissolved sulphur-containing components is fed via 10 to a heat exchanger E2 where it is warmed prior to being fed to a stripper A2 in which the sulphur-containing components are separated and removed overhead via 11 before being sent for further processing in a Claus plant. Any final amounts of carbon dioxide present in the stream to the Claus plant may be recovered as a tail gas for recycling to line 2 as well (not shown). Pure methanol is removed from the bottom of A2 via line 12 after which it is fed via 24 to the top of A3 after having been cooled in a heat exchanger E3 and topped up with fresh methanol as required.

Sweet shifted synthesis gas at 60 bar is removed overhead from A1 via 14 after which it is cooled in one or a series of heat exchanger (shown schematically in FIG. 1 as E4) to −50° C. in order to create a two-phase mixture of liquid carbon dioxide and a hydrogen-containing gas. The two-phase mixture is next fed via 15 to a first fractionator F4 where it is separated into liquid carbon dioxide and residual gas. Thereafter the liquid is taken off at the bottom via 16 whilst the gas is taken off overhead via 17, compressed and cooled in one or more compressors and associated heat exchanger (shown schematically in FIG. 1 as C4 and E5) to a pressure of 150 bar and −50° C. creating a second two-phase mixture which is separated in a second separator F5 as before. The liquid carbon dioxide obtained from F5 is fed via 18 to 16 where it is combined with that recovered from F4 before being taken away for storage. As explained below the various heat exchangers used in this stage are integrated with cold streams in the turbo-expander/heat exchanger section described below in order to utilize the cooling capacity of these latter streams.

The gas recovered overhead from F5 now rich in hydrogen and at a pressure of 150 bar and −50° C. is next fed via 19 to the base of A3 where it is contacted countercurrently with cold methanol at the same temperature. In A3 the cold methanol is warmed and extracts residual carbon dioxide from the hydrogen containing gas prior to the treated gas being removed overhead via line 20. Meanwhile the methanol containing dissolved carbon dioxide is removed from the bottom of A3 via 21 at a temperature of −35° C. reduced in pressure to 60 bar by means of a hydraulic turbine T1 before being fed first to a separator A5 to remove and recycle any entrained hydrogen (via line 22) and then cooled in heat exchanger E6 back down to −50° C. before being fed via 13 to A1.

The hydrogen gas removed overhead from A3 still at a pressure of 150 bar and −50° C. is warmed in heat exchanger E7 and progressively reduced in pressure and warmed by a series of turbo-expanders T2, T3 and T4 and associated interstage heat exchangers E8, E9 and 10 to near ambient temperature and a pressure of 30 bar. In doing so the energy released by the turbo-expanders is used to generate power for driving other equipment. At the same time the cooling capacity removed in E7 and in E8, E9 and E10 (caused by expansion of the hydrogen-containing gas) is used to supply cooling capacity to the heat exchangers E4 and E5. Although for simplicity this is not shown here one of ordinary skill will understand how this can be done for example by making one or more of the heat exchangers E7, E8, E9 and E10 on the one hand integral with one or more of the heat exchangers in E4 and E5 on the other. Furthermore our co-pending applications PCT/GB/2009/02895, PCT/GB/2009/002884 and PCT/GB/2009/001810 mentioned above illustrate specific configurations by which this can be done involving the use of multi-channel heat exchangers.

The hydrogen-containing gas leaving the final heat exchanger via line 23 can optionally be fed to the burners of one or more gas turbines (not shown) where the hydrogen is burnt with an oxygen containing gas to generate power and steam.

EXAMPLE 2

Figure 2:
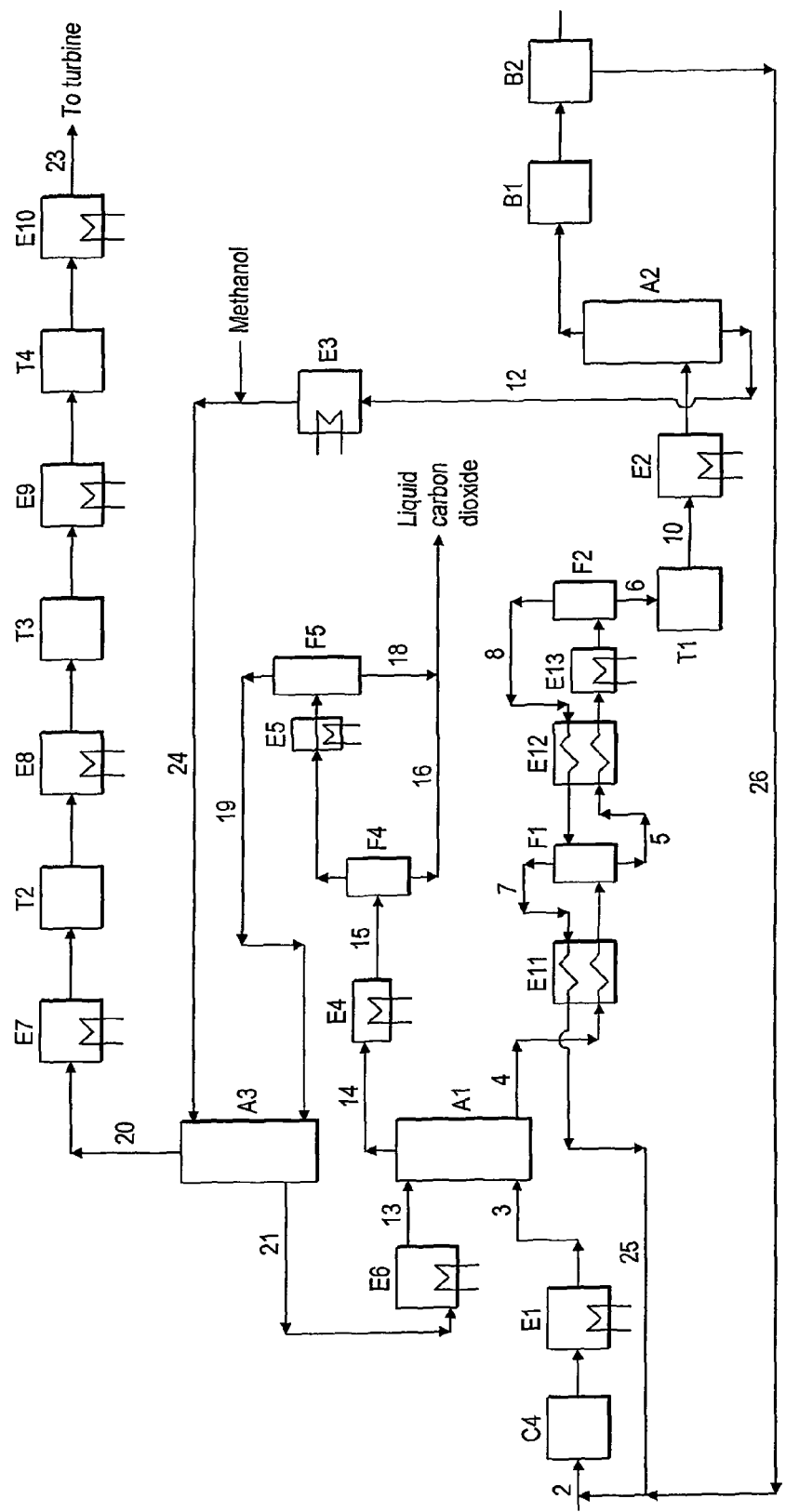
FIG. 2 shows schematically a second example of separation of a shifted synthesis gas feedstock.

FIG. 2 illustrates a variant on the scheme shown in FIG. 1 incorporating two other features. These are (1) the first and second scrubbers work under the same high pressure and (2) the carbon dioxide is released from the first scrubber alcohol effluent stream by means of a progressive temperature rise through a series of heat exchangers. A high temperature sour shifted synthesis gas feedstock at a pressure of 60 bar fed via line 2 is compressed and cooled in one or more compressors and associated heat exchangers (shown schematically in FIG. 2 as C4 and E1) to a pressure of 150 bar. Heat exchanger E1 then cools the synthesis gas down to a temperature of 9° C. before it is fed via 3 to a first scrubber A1 where it is contacted with a methanol solvent containing dissolved carbon dioxide as described above in Example 1. The methanol solvent used is obtained from a second scrubber A3 (see below), fed to the top of A1 via 13 and removed from the bottom via 4. The methanol so removed and now containing the sulphur-containing components and some carbon dioxide is fed then via 4, 5 and 6 to a series of heat exchangers and separators (E11,E12,E13, F1 and F2) where the temperature is progressively increased and carbon dioxide is released. Overhead gas streams 7 and 8 from each of F2 and F1 are fed to heat exchangers E12 and E11 arranged in series which recover heat for heating up the incoming stream and then recycled via 25 to line 2. E13 supplements heat required for these heat exchange process. Meanwhile the methanol solvent from F2 still containing dissolved sulphur-containing components is reduced in pressure by means of a hydraulic turbine T1 before being fed via 10 to a heat exchanger E2 where it is optionally warmed prior to being fed to a stripper A2 in which the sulphur-containing components are separated and removed overhead via 11 before being sent for further processing in a Claus plant. Pure methanol is removed from the bottom of A2 via line 12 after which it is fed via 24 to the top of A3 after having been cooled in a heat exchanger E3 and topped up with fresh methanol as required.

Sweet shifted synthesis gas at 150 bar is removed overhead from A1 via 14 after which it is cooled in one or a series of heat exchanger (shown schematically in FIG. 1 as E4) to −30° C. in order to create a two-phase mixture of liquid carbon dioxide and a hydrogen-containing gas. The two-phase mixture is next fed via 15 to a first fractionator F4 where it is separated into liquid carbon dioxide and residual gas. Thereafter the liquid is taken off at the bottom via 16 whilst the gas is taken off overhead via 17, cooled in one or more heat exchanger (shown schematically in FIG. 2 as E5) to −50° C. creating a second two-phase mixture which is separated in a second separator F5 as before. The liquid carbon dioxide obtained from F5 is fed via 18 to 16 where it is combined with that recovered from F4 before being taken away for storage. As explained below the various heat exchangers used in this stage are integrated with cold streams in the turbo-expander/heat exchanger section described below in order to utilize the cooling capacity of these latter streams.

The gas recovered overhead from F5 now rich in hydrogen and at a pressure of 150 bar and −50° C. is next fed via 19 to the base of A3 where it is contacted countercurrently with cold methanol at the same temperature. In A3 the cold methanol extracts residual carbon dioxide from the hydrogen containing gas prior to the treated gas being removed overhead via line 20. Meanwhile the methanol containing dissolved carbon dioxide is removed from the bottom of A3 via 21 and optionally cooled in heat exchanger E6 before being fed via 13 to A1.

The hydrogen gas removed overhead from A3 still at a pressure of 150 bar and −50° C. is warmed in heat exchanger E7 and progressively reduced in pressure and warmed by a series of turbo-expanders T2, T3 and T4 and associated interstage heat exchangers E8, E9 and 10 to near ambient temperature and a pressure of 30 bar. In doing so the energy released by the turbo-expanders is used to generate power for driving other equipment. At the same time the cooling capacity removed in E7 and in E8, E9 and E10 (caused by expansion of the hydrogen-containing gas) is used to supply cooling capacity to the heat exchangers E4 and E5. Although for simplicity this is not shown here one of ordinary skill will understand how this can be done for example by making one or more of the heat exchangers E7, E8, E9 and E10 on the one hand integral with one or more of the heat exchangers in E4 and E5 on the other. Furthermore patent applications PCT/GB/2009/02895, PCT/GB/2009/002884 and PCT/GB/2009/001810 mentioned above illustrate specific configurations by which this can be done involving the use of multi-channel heat exchangers.

The hydrogen-containing gas leaving the final heat exchanger via line 23 can optionally be fed to the burners of one or more gas turbines (not shown) where the hydrogen is burnt with an oxygen containing gas to generate power and steam.

EXAMPLE 3

Figure 3:
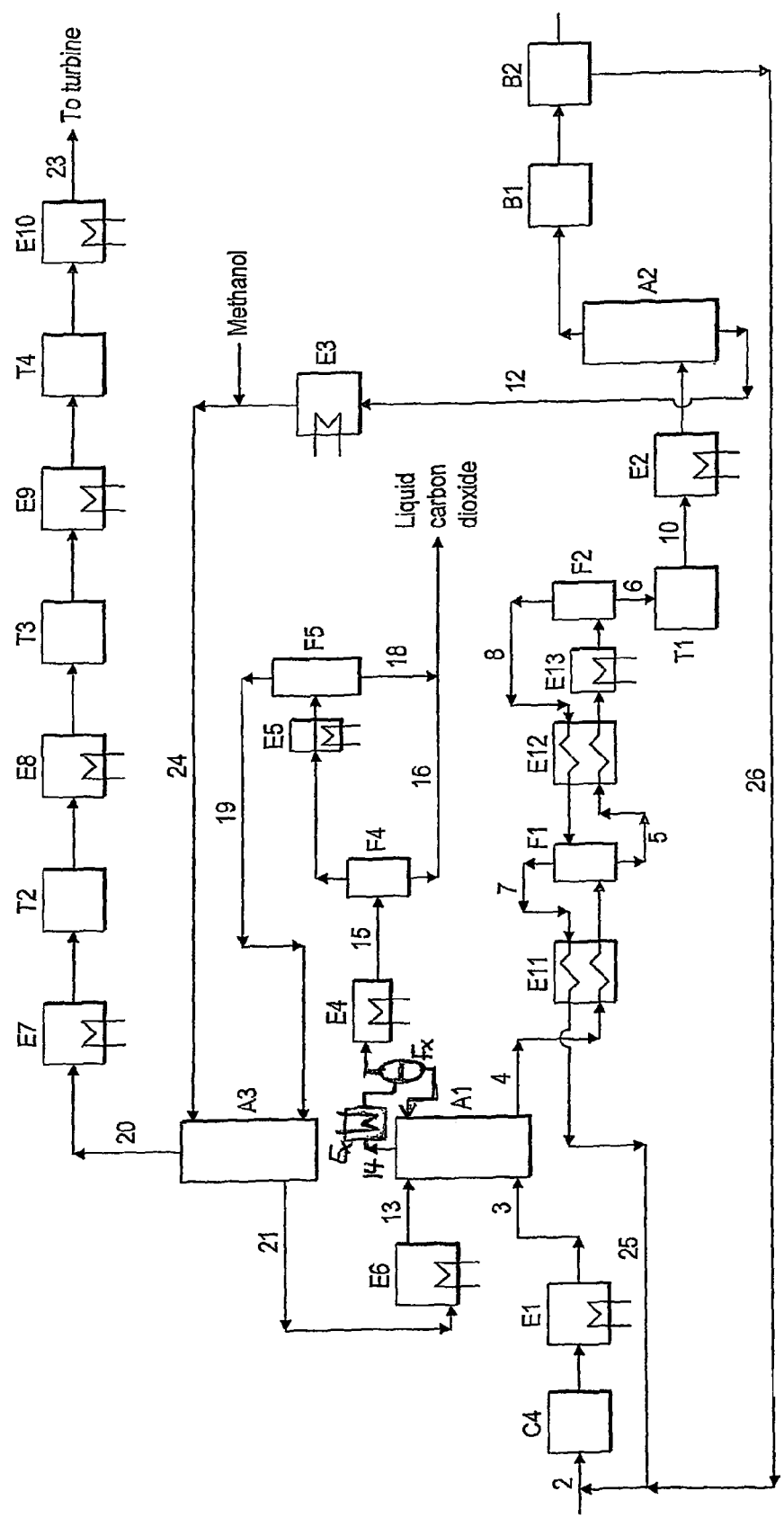
FIG. 3 shows schematically a third example of separation of a shifted synthesis gas feedstock, this third example being a variant of the second example including solvent recovery.

FIG. 3 illustrates a variant on the scheme shown in FIG. 2 incorporating a methanol recovery feature provided by the separator Fx and heat exchanger Ex. Using these additional features, methanol is recovered and returned to the top tray of the $H_2S$ absorber.

A high temperature sour shifted synthesis gas feedstock at a pressure of 60 bar fed via line 2 is compressed and cooled in one or more compressors and associated heat exchangers as described in relation to FIG. 2 to a pressure of 150 bar. Heat exchanger E1 then cools the synthesis gas down before it is fed via 3 to a first scrubber A1 where it is contacted with a methanol solvent containing dissolved carbon dioxide as described above in Example 1. The methanol solvent used is obtained from a second scrubber A3 (see below), fed to the top of A1 via 13 and removed from the bottom via 4. The methanol so removed and now containing the sulphur-containing components and some carbon dioxide is fed then via 4, 5 and 6 to a series of heat exchangers and separators (E11,E12,E13, F1 and F2) as described in relation to FIG. 2 in which the sulphur-containing components are separated and removed before being sent for further processing in a Claus plant. Pure methanol is removed from the bottom of A2 via line 12 after which it is fed via 24 to the top of A3 after having been cooled in a heat exchanger E3 and topped up with fresh methanol as required.

Sweet shifted synthesis gas at 150 bar is removed overhead from A1 via 14. Before being cooled to form a two-phase mixture by means of the heat exchanger system E4, an initial intermediate cooling is carried out in heat exchanger system Ex (which may include one or more heat exchanger elements) to cool the gas to a temperature of about 13 degrees C. The cooled gas is passed to an intermediate separator from which methanol is removed and passed back to the first scrubber A1. The treated shifted syngas is then passed to the heat exchanger system E4 for subsequent process steps as described in relation to FIG. 2.

Other features of Example 3 are as described in relation to FIG. 2.

In this example, the recovery of methanol from the process can be for example more than 90%, for example 94%.

In a further example, the heat exchanger Ex could be replaced by an expander which would effect cooling of the gas stream by expansion. After recovery of the methanol solvent in separator Fx, a compressor may be provided upstream of heat exchanger E4 to repressurise the gas stream after separation of the solvent.

In a further variant, a water washing apparatus may be provided downstream of the separator Fx to remove further methanol from the gas. For example a contactor may be provided downstream of the separator Fx to wash the gas with water. The resulting gas stream will contain a reduced amount of solvent and may be in some cases substantially free of solvent (for example methanol) and saturated with water. The water is then preferably removed from the substantially solvent free gas, for example by a standard drying method. The solvent, for example methanol, may be recovered from the solvent-containing water stream exiting the wash column by distillation, wherein the purified water may then be returned to the water wash column. The substantially dried solvent may be returned back to the solvent system.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A process for separating a sour shifted synthesis gas feedstock into liquid carbon dioxide, a gaseous hydrogen containing gas and separated sulphur-containing components by superatmospheric refrigeration wherein the process comprises the following stages:
   a. scrubbing the sour shifted gas at elevated pressure with an alcohol solvent in a first scrubber and separately recovering an alcohol stream containing the sulphur-containing components and a sweet shifted gas, wherein the sour shifted gas is cooled by direct contact with the alcohol solvent in the first scrubber;

b. thereafter cooling the sweet shifted gas to a temperature and elevated pressure at which the carbon dioxide contained therein condenses and a two-phase gas-liquid mixture is formed;

c. separating the two-phase mixture of stage (b) into separate liquid carbon dioxide and gaseous hydrogen-containing fractions in a fractionation unit;

d. extracting residual carbon dioxide from the separated gaseous hydrogen-containing fraction by scrubbing the gaseous hydrogen-containing fraction at elevated pressure with an alcohol solvent in a second scrubber and recovering an alcohol stream containing carbon dioxide, wherein the fractionation unit and the second scrubber are adapted to operate at approximately the same temperature, and wherein the extracting of the residual carbon dioxide in the second scrubber occurs after the separating of the two-phase mixture in the fractionation unit without intermediate treatment of the separated gaseous hydrogen-containing fraction;

e. feeding the alcohol stream containing carbon dioxide produced in step (d) to the first scrubber; and f. warming and expanding the scrubbed gaseous hydrogen-containing fraction using at least one heat exchanger to exchange heat with the mixture of step (b) and at least one turbo-expander capable of recovering mechanical work.

2. A process as claimed in claim 1 wherein the sweet shift gas is further compressed before step (b).

3. A process as claimed in claim 1 wherein the alcohol stream containing the sulphur-containing components is treated to recover any carbon dioxide dissolved therein.

4. A process as claimed in claim 3 wherein the carbon dioxide is recovered through a series of flash vessels in which the pressure is partially let down.

5. A process as claimed in claim 3 wherein the carbon dioxide is recovered through a series of heat exchangers and separators in which the temperature is gradually increased.

6. A process as claimed in claim 3 wherein the recovered carbon dioxide is recycled to the sour shifted synthesis gas feedstock.

7. A process as claimed in claim 3 wherein the recovered carbon dioxide is fed to the second scrubber.

8. A process as claimed in claim 3 wherein the recovered carbon dioxide is returned to the sweet shifted gas.

9. A process as claimed in claim 1 wherein step (d) employs a plurality of fractionation units operating at the same temperature but differing pressures.

10. A process as claimed in claim 1 wherein the inlet temperature for the alcohol solvent in the first scrubber is in the range −50 to −20° C. and the outlet temperature is in the range +5 to +35° C.

11. A process as claimed in claim 1 further including the step of recovering solvent from the sweet shifted gas generated in step (a).

12. A process according to claim 11 including cooling the sweet shifted gas generated in step (a), separating solvent from the cooled sweet shifted gas and feeding the separated solvent to the first scrubber.

13. A process according to claim 11, including passing the sweet shifted gas generated in step (a), to an expander, and expanding the gas to form a cooled gas and solvent liquid, and separating the solvent from the cooled gas.

14. A process according to claim 13, further including feeding the separated solvent to a third scrubber.

15. A process according to claim 13 further including compressing the cooled gas after separation of the solvent from the cooled gas.

16. A process according to claim 1 further including the step of washing the sweet shifted syngas with water to remove solvent from the sweet shifted syngas.

17. A process according to claim 16, further including the step of drying the syngas after the washing with water step.

18. A process according to claim 16, further including treating water used for the washing after the washing step to recover solvent from the water.

19. A process according to claim 18, further including the feeding the recovered solvent to a third scrubber.

20. A gas separation plant for converting sour shifted synthesis gas into separate streams consisting of liquid carbon dioxide, a hydrogen-rich fraction and sulphur-containing components, the plant comprising:
  a. a first scrubber for sweetening sour shifted gas by removing sulphur-containing components in an extraction process which uses an alcohol solvent derived from a second scrubber;
  b. a cooling system for cooling the sweetened shifted gas to a temperature at which carbon dioxide condenses and a two-phase gas-liquid mixture is formed said cooling system further comprising at least one heat exchanger in which relatively warm shifted synthesis gas is cooled against the relatively cool liquid carbon dioxide fraction and/or the relatively cool gaseous hydrogen-rich fraction generated by a fractionation unit;
  c. a fractionation unit for separating the two-phase mixture generated in said cooling system into separate liquid carbon dioxide and gaseous hydrogen-rich fractions;
  d. the second scrubber for removing residual carbon dioxide from said gaseous hydrogen-rich fraction by extraction using an alcohol solvent and adapted to provide the treated alcohol solvent to the first scrubber, wherein the fractionation unit and the second scrubber are adapted to operate at approximately the same temperature, and wherein the alcohol solvent is fed to the second scrubber at approximately the same temperature as an operating temperature of the second scrubber; and
  e. an expansion system for warming and expanding the separated gaseous hydrogen-rich fraction comprising at least one turbo-expander for progressively recovering energy from the gaseous hydrogen-rich fraction as mechanical work and at least one means for supplying cooling capacity to at least one of the heat exchangers in the cooling system.

21. A plant according to claim 20, further including a solvent recovery system including means for cooling a gas including solvent, and a separator.

22. A plant according to claim 21, wherein the means for cooling the gas includes an expander, the expander being arranged to receive and expand a gas including solvent to form a gas including liquid solvent, the separator being arranged to separate the liquid solvent from the gas.

* * * * *